United States Patent [19]

Chika

[11] 4,290,620
[45] Sep. 22, 1981

[54] STRUCTURE TO COUPLE TWO BICYCLES

[76] Inventor: John J. Chika, 1350 Orchard Ridge Rd., Bloomfield Hills, Mich. 48013

[21] Appl. No.: 597,311

[22] Filed: Aug. 8, 1975

Related U.S. Application Data

[63] Continuation-in-part of Ser. No. 437,482, Jan. 28, 1974, abandoned.

[51] Int. Cl.² .................................................. B62K 13/06
[52] U.S. Cl. ...................................... 280/209; 280/282; 280/289 A
[58] Field of Search ....................... 280/209, 7.16, 282, 280/289 A

[56] References Cited

U.S. PATENT DOCUMENTS

| | | | |
|---|---|---|---|
| 636,155 | 10/1899 | MacKay | 280/209 |
| 646,791 | 4/1900 | Bemenderfer | 280/209 |
| 739,633 | 9/1903 | Akers | 280/209 |
| 2,248,223 | 7/1941 | Fellman | 280/209 |
| 3,768,834 | 10/1973 | Singleton | 280/209 |
| 3,794,352 | 2/1974 | Popp | 280/209 |

FOREIGN PATENT DOCUMENTS

| | | | |
|---|---|---|---|
| 605567 | 5/1926 | France | 280/209 |
| 443900 | 6/1949 | Italy | 280/209 |
| 22529 | of 1896 | United Kingdom | 280/209 |
| 506208 | 5/1939 | United Kingdom | 280/209 |

*Primary Examiner*—L. J. Paperner
*Assistant Examiner*—Terrance L. Siemens

[57] ABSTRACT

The disclosure provides for torsionally resilient interconnection structure of two existing bicycles into side-by-side or parallel cooperative relationship, by employing plurality of torsionally resilient connecting members which are bent to form a longer mid-portion and two shorter end portions, with their longer mid-portions positioned substantially horizontally and transversely between the main frame tubes of the two bicycles, and their shorter end portions aligning longitudinally with the correspondingly positioned frame tubes of the two bicycles and operatively attached to them at two spaced-apart points, including novel steering linkage and front wheels tie-rod system allowing the two coupled bicycles to be operated as one four-wheel vehicle and enabling it to carry additional people and cargo.

71 Claims, 50 Drawing Figures

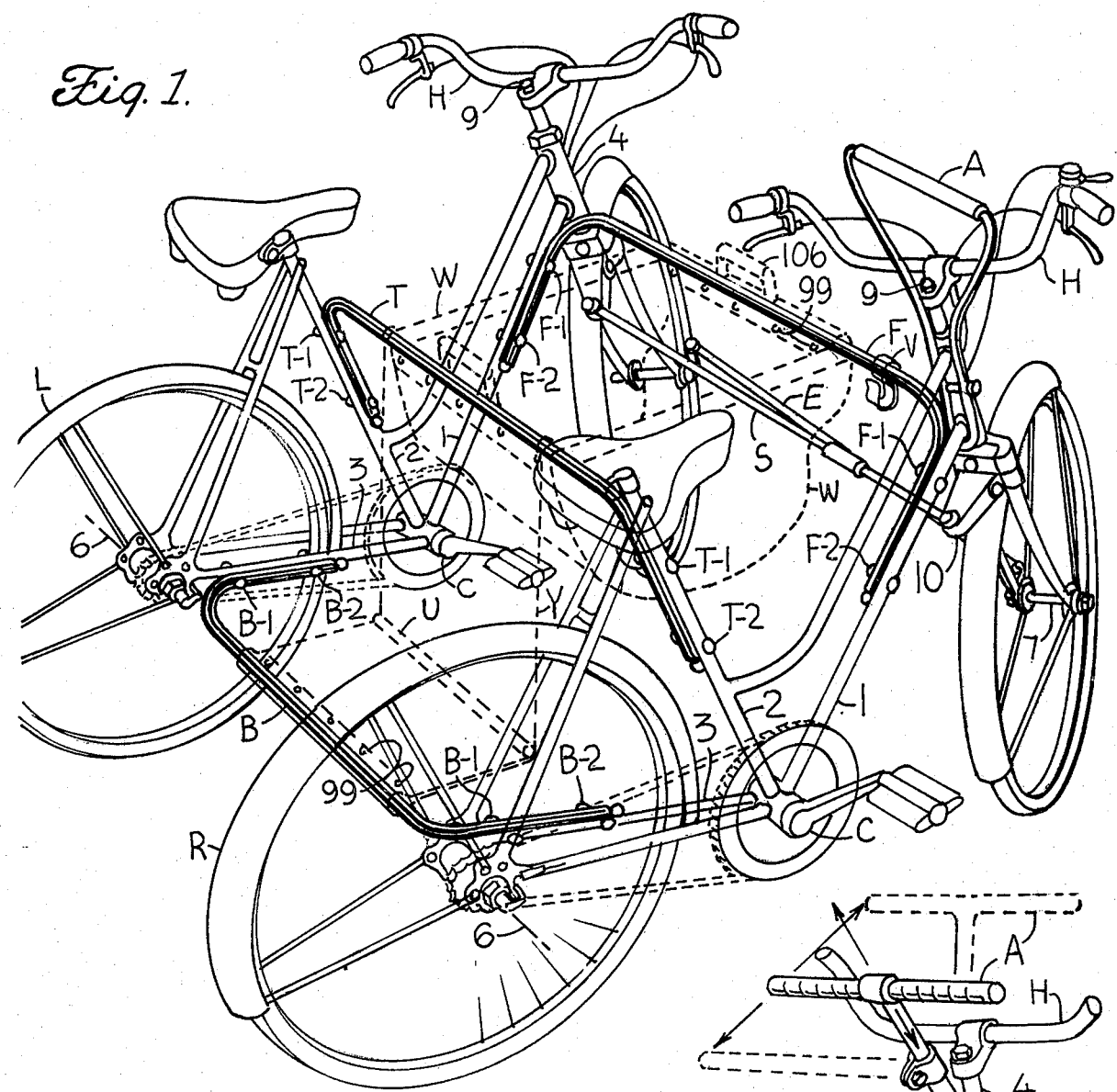

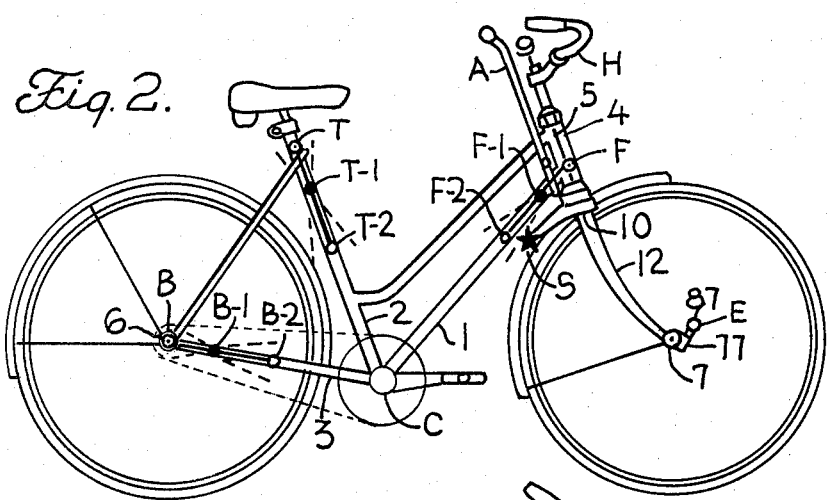
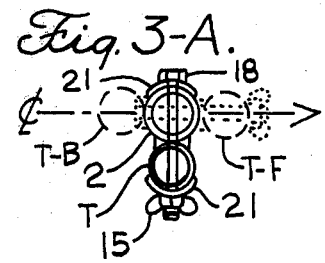
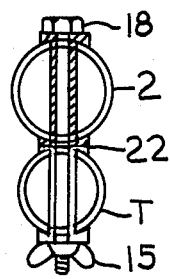
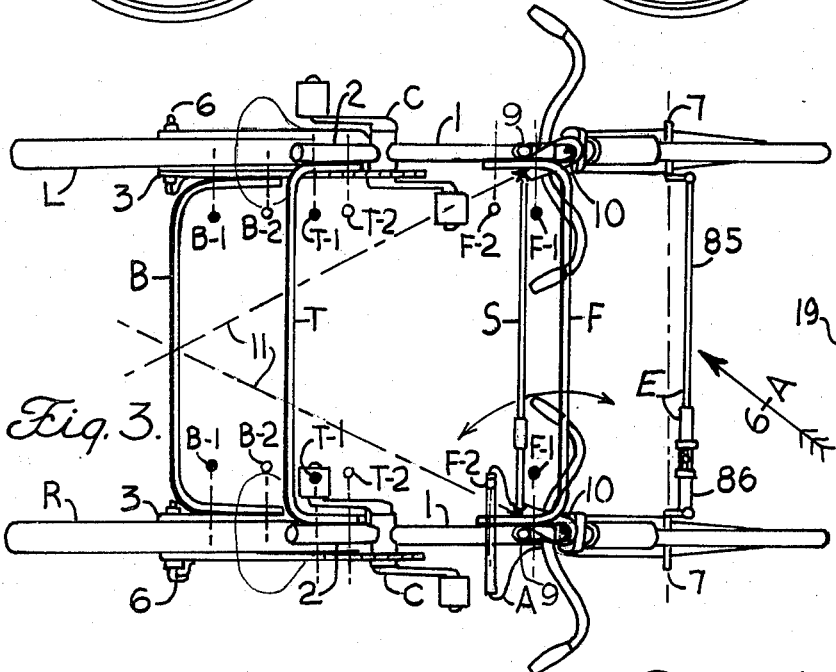
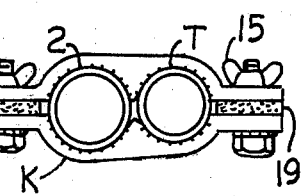
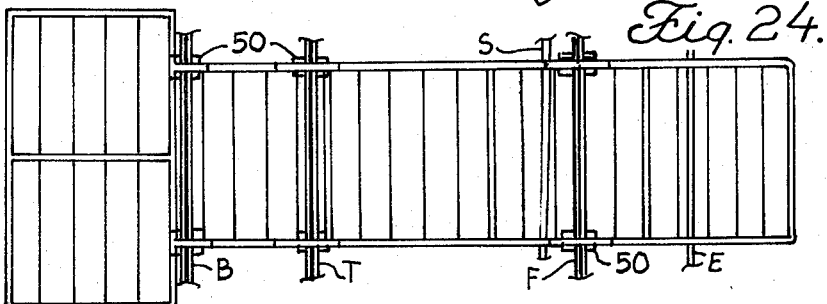
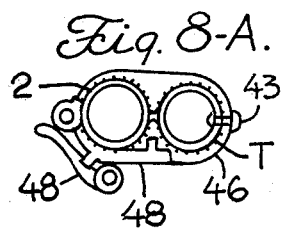
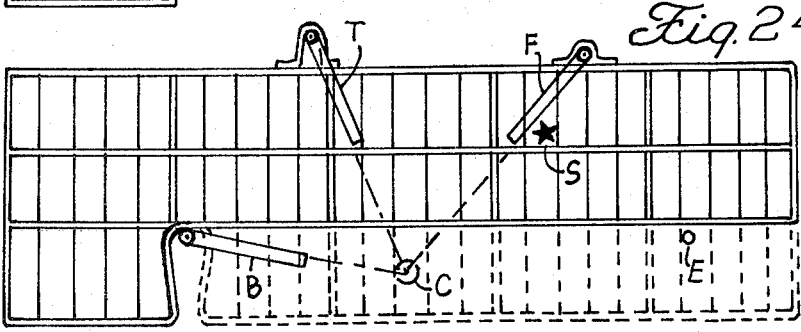
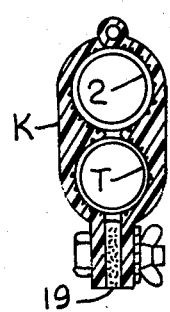

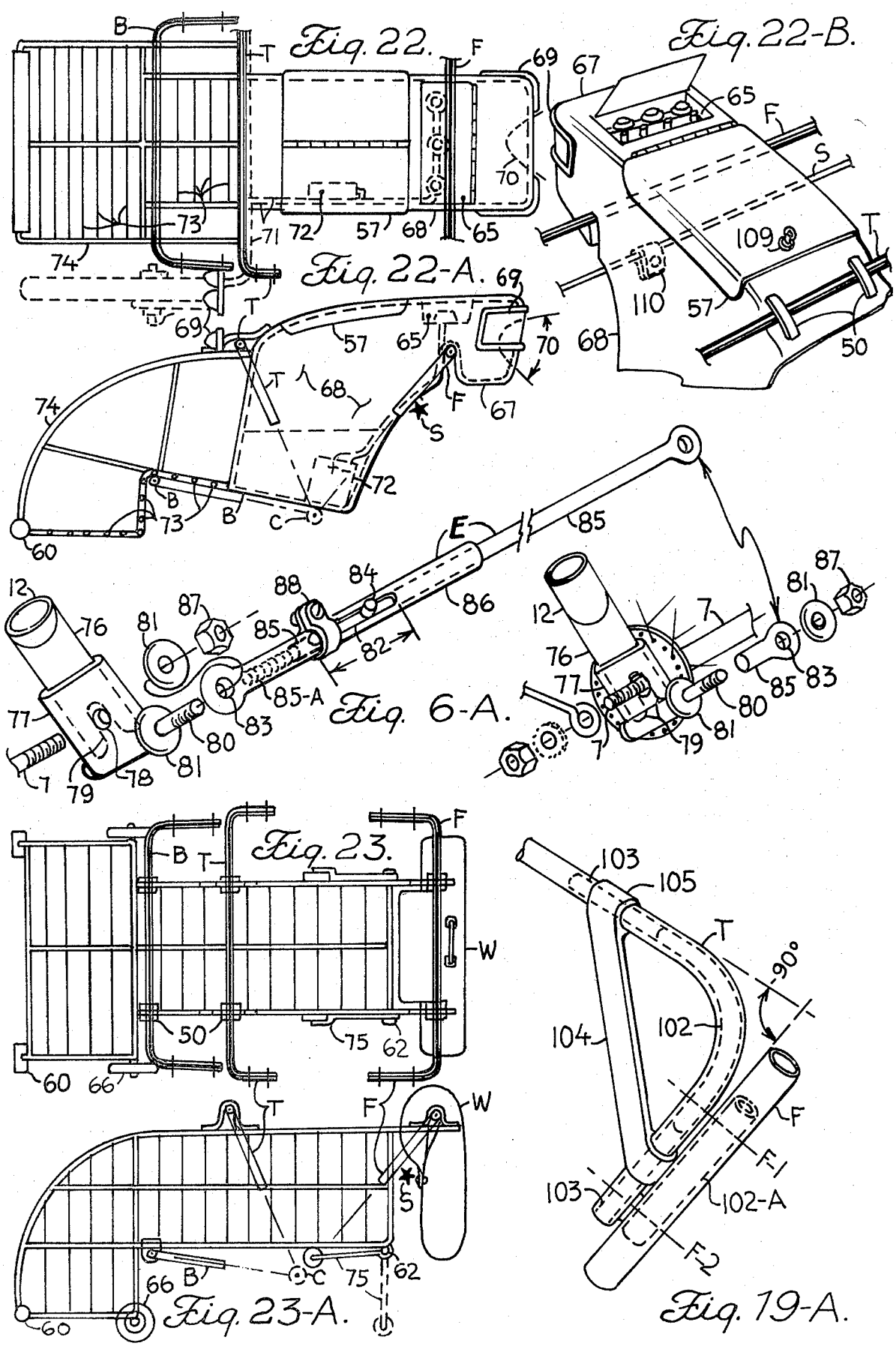

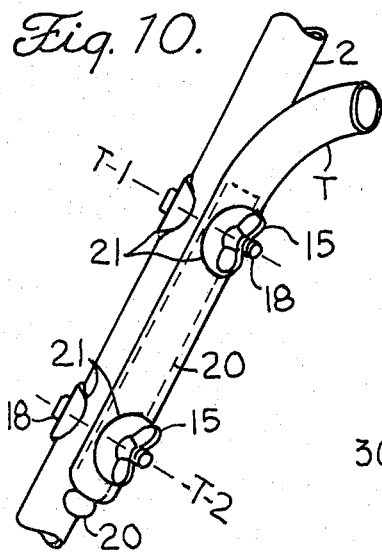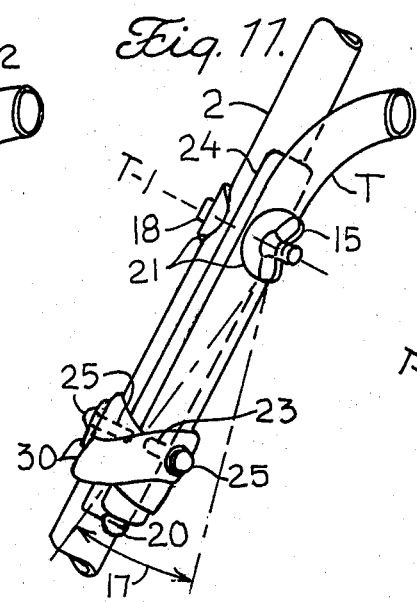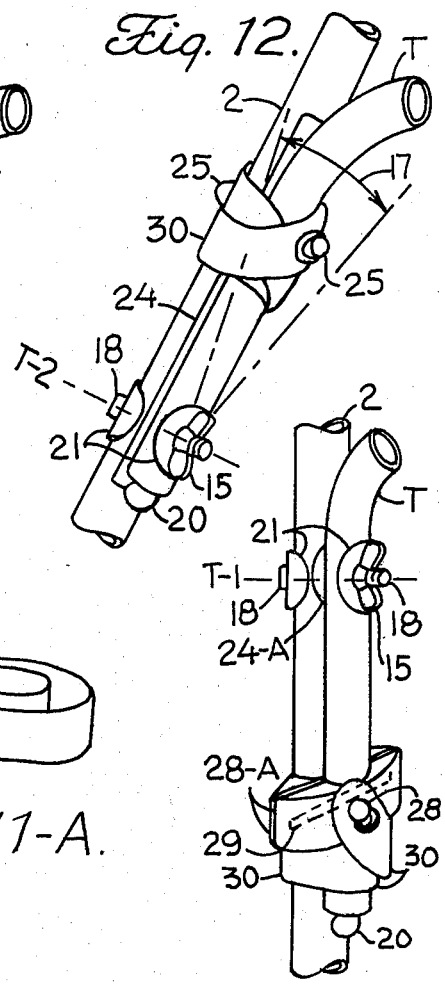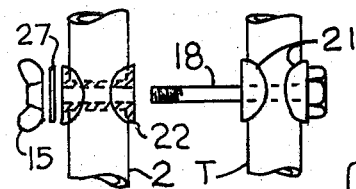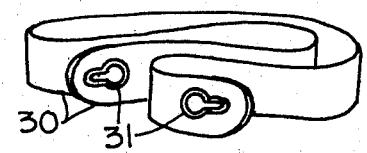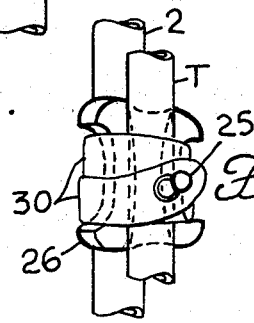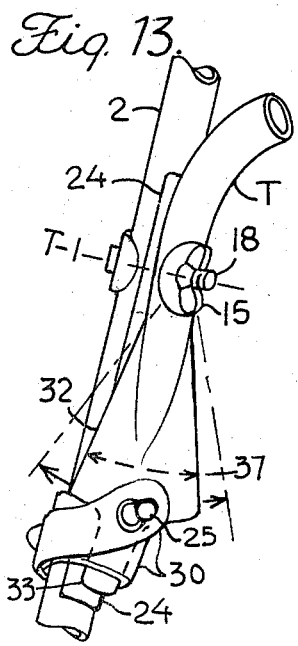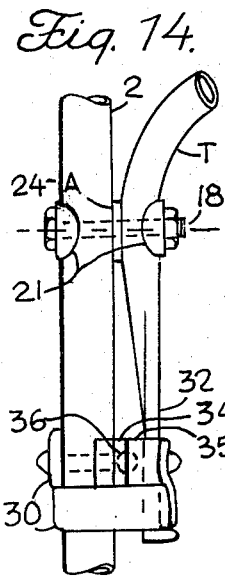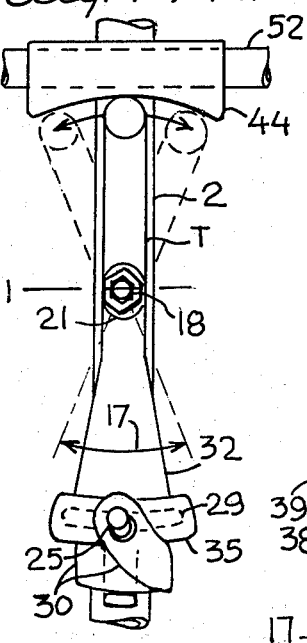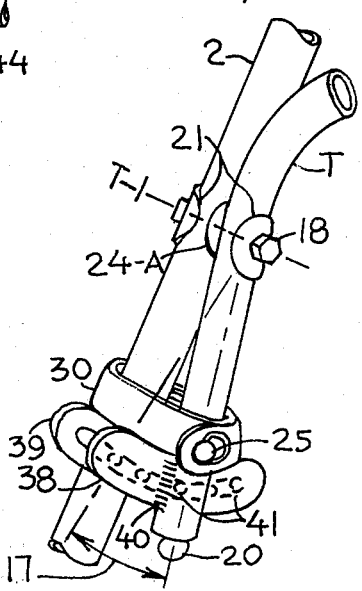

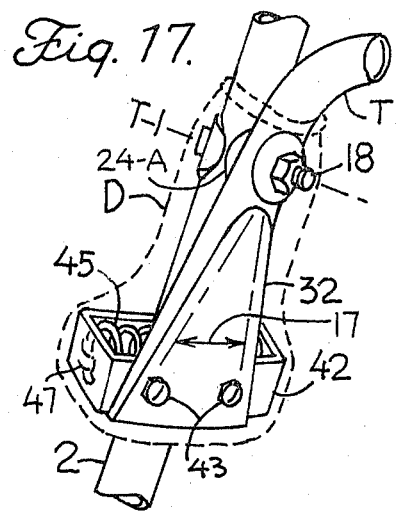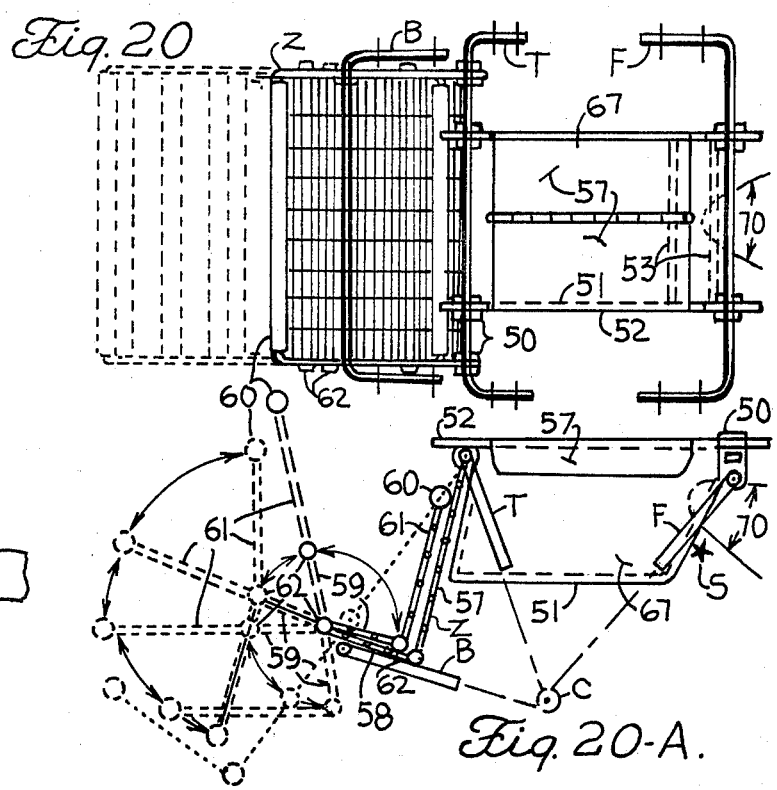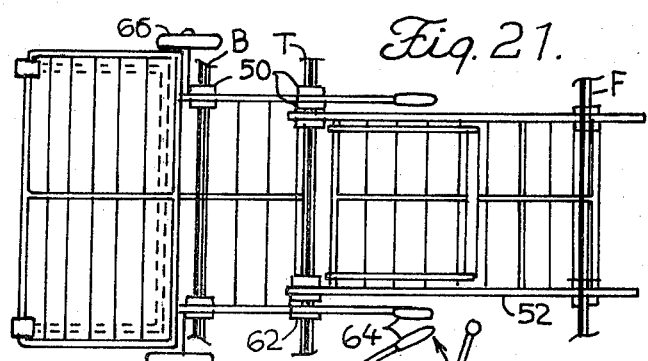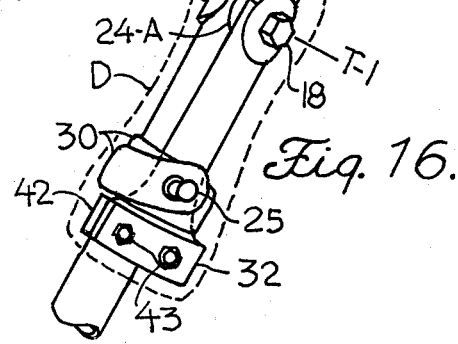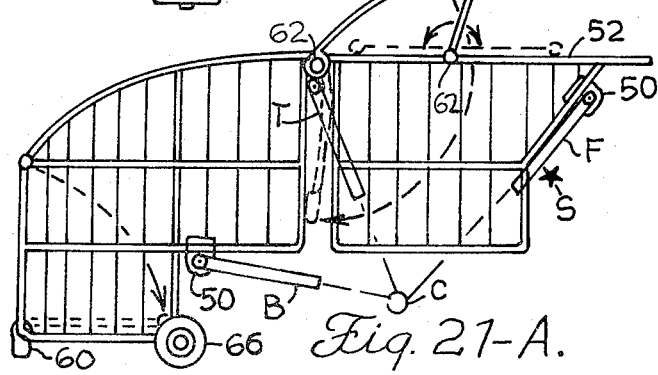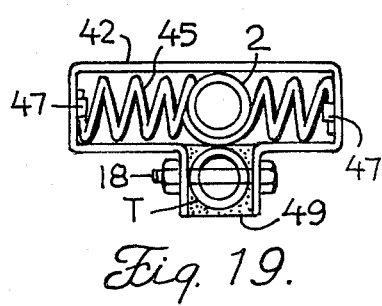

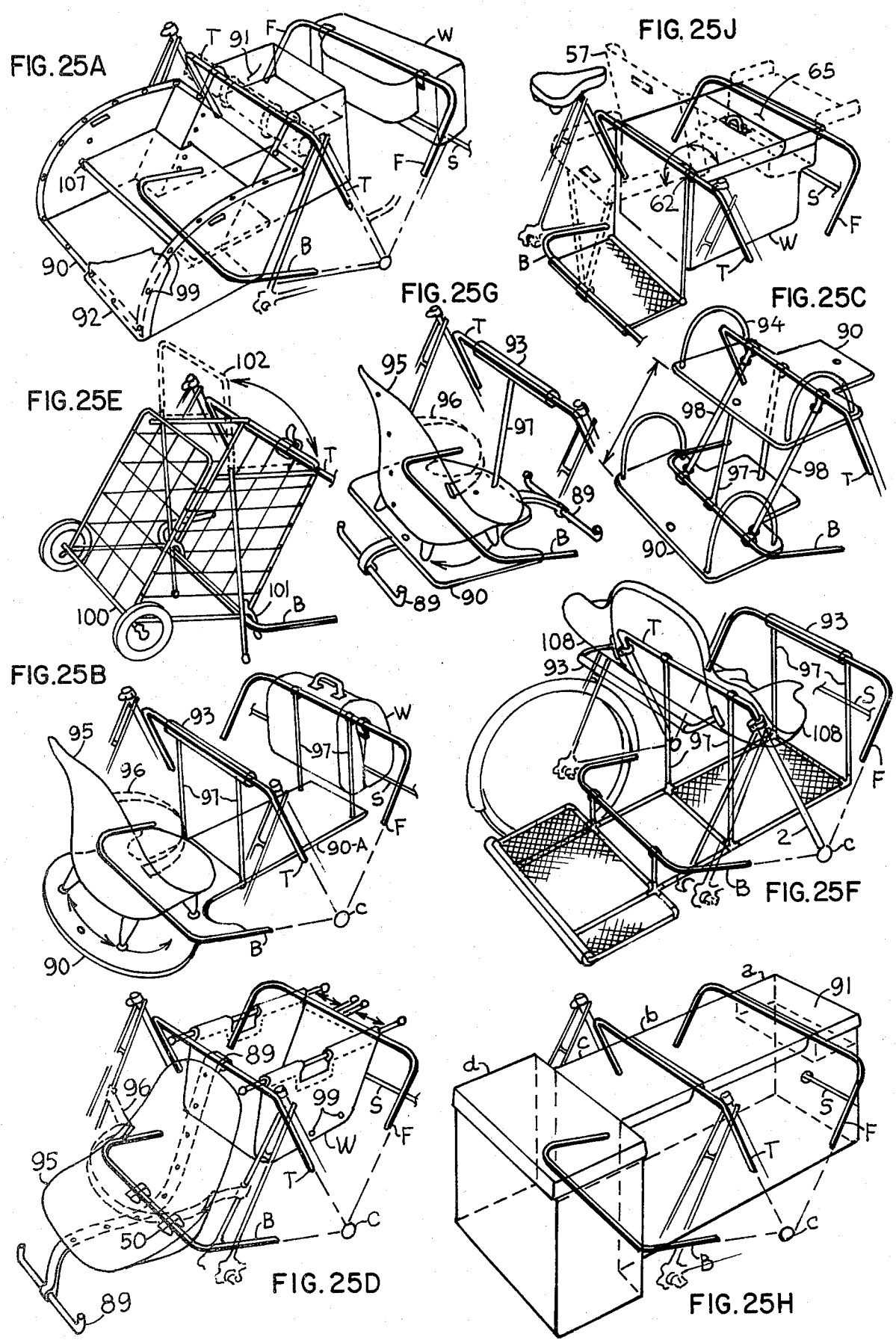

STRUCTURE TO COUPLE TWO BICYCLES

SUMMARY OF THE INVENTION

This application is a continuation-in-part of my co-pending application Ser. No. 437,482 filed Jan. 28, 1974, now abandoned, entitled "Apparatus for Constructing Torsionally Resilient Vehicles".

The primary object of this invention is to provide a light, economical and utilitarian type of a vehicle to help fill the transportation gap existing between the single bicycle and the automobile of today by creating a simple apparatus for quickly and easily coupling any two similarly configured bicycles into side-by-side spaced-apart relationship, thus producing a four-wheel vehicle which is steered like a car, operable and propellable by either or both of its two riders and providing extra capacity to carry additional people or cargo as desired while at all times being just as easily and quickly disconnectable to allow the two bicycles to be operable individually as before.

There have been many atempts to connect two bicycles into side-by-side relatiship but none of them proved to be practical. Some of the interconnecting structures were simply welded to the bicycle frames, thus making any repeated disconnection impossible; others were just "clamped" together and quickly collapsed under adverse load and road conditions; some tried to preserve the "feel" and "handling" of the single bicycle but failed because thus constructed vehicle could not recover from the stress of "leaning into the turn" when negotiating any curves in the road, and finally, all of them failed to prevent the front wheels from "spreading" or "converging" under driving conditions when overloaded.

These and other problems associated with the prior art are overcome by this invention which creates a unique four-wheel vehicle which does not "lean into the turn" but is steered like an automobile, is very stable when driven or parked, provides independent torsion-type suspension for all four wheels and is able to transport additional people or cargo when desired; it may be easily adjusted for efficient use not only on the smooth city streets but over the cross-country roads and at all times easily disconnectable to allow the two bicycles to be operated individually or one of them replaced.

This type of connecting structure is possible by the use of uniquely conceived connecting members or "torsiotubes", each of them bent to form a longer mid-portion and two shorter end-portions; their longer mid-portions serving as transverse spacers between the two bicycles and their bending flexure and torsional twisting resilience about their longitudinal axis providing torsional suspension for both of the connected bicycles and all four wheels in relation to each other by means of their shorter ends which are connected to the respective tubes of said bicycles and act alternately as either the lever-arms of the torsion-tube or means of its attachment to the opposite bicycle frame.

Thus the torsiontubes perform four major functions:
1. they keep the connected bicycles in parallel relationship to each other under all normal driving conditions and loads, over all types of normal roads;
2. their torsionally resilient mid-portions possess sufficient degree of bending flexure and torsional twisting resiliency to enble thus coupled bicycles to follow their own terrain and road levels and irregularities independent of each other;
3. their independent torsion-type suspension means are individually adjustable to negotiate various terrain and load conditions;
4. their longer mid-portions provide sufficient means of support for attachment of various accessories configured to enable the vehicle to transport additional people and various cargoes in endless combinations.

More specific object of this invention is to provide a light four-wheel vehicle which two people could ride side-by-side, without any need to balance it while driving or stopping, which either one could steer and either one or both could pedal, and including easily attachable and removvble or interchangeable accessories enabling them to take along their children, relatives, friends or various cargoes in any combination they desire.

Other objects are to provide a light, economical vehicle to substitute for the second family car; to make local deliveries; to provide local transportation for retirees, handicapped people and those unable to ride regular bicycles; in short, a vehicle very economical to produce and maintain, easily repairable with standard parts universally available and at all times being convertible into any configuration needed or completely removable to allow the bicycles to be used individually again.

The above objectives and many additional benefits of this invention will become more apparent upon consideration of the following specification and accompanying drawings wherein like characters of reference designate corresponding parts through the several views and in which:

FIG. 1 is a perspective view of two similarily configured ladies' style bicycles converted into a 4-wheel vehicle according to this invention;

FIG. 2 is a diagrammatic side view of the assembly;

FIG. 3 is a diagrammatic plan view of the assembly;

FIG. 3-A and 3-B show tube connections in more detail;

FIG. 4 shows a modified type of connecting member;

FIG. 5 shows modification of an auxiliary handle bar;

FIG. 6 is a detail perspective of the track-arm bracket;

FIG. 6-A shows the tie-rod assembly;

FIG. 7 shows a quick-type of connectors for the assembly;

FIGS. 8,8-A, 9 show varied types of "quick-clamps";

FIGS. 10,10-A show a rigid way of attaching connecting means;

FIGS. 11-19 illustrate some of the simplest ways to provide for the resiliently pivotal attachment of connecting members;

FIGS. 20-25 illustrate some of specifically modified accessories configured to make the vehicle more useful.

Referring to the drawings wherein like numerals designate like parts throughout this description, FIG. 1 is a general perspective view of two ladies-type bicycles as they would appear when coupled by the presently disclosed torsionally resilient interconnection structure, spaced approximately 32" or 80 cm apart, which would create sufficiently stable four-wheel vehicle.

For the sake of simplicity, this sytem of coupling will be called "torsiontype" system; the torsionally resilient connecting tubes will be called "torsiontubes", and the resulting vehicle will be a "KONVERT-CYCLE" when easily, quickly convertible and it will be a "QUADCYCLE" when assembled for more permanent conversion.

Comparing FIGS. 1,2 and 3, it is easily understood how the 3 "torsiontubes" F,T and B connect and keep the two bicycles in spaced-apart relationship. Torsiontubes T and F are of the same span and bent at exactly right angles, in fact they are interchangeable, but torsiontube B is slightly shorter and bent at an obtuse angle, to match the angle of the chain-stays 3; thus all three torsiontubes have their shorter ends positioned flat against the inboard facing sides of bicycle tubes 1, 2 and 3, for their operative attachment to them at two spaced-apart points: F-1 and F-2; T-1 and T-2, and B-1 and B-2, by sufficiently long bolts installed through holes drilled through both the frame tubes and the torsiontubes transversely to the longitudinal center line of the vehicle. The longer mid-portion of torsiontube B lines up with the two rear axles 6 of the two cycles, thus assuming the function of the rear axle of the Konvertcycle; the F torsiontube lines up with the center-lines 5 of head-tubes 4, and the T torsiontube is installed as high as the seat-stays of the bicycles allow, in order to provide utmost stability for the seated riders.

When men's type of bicycles are coupled, the torsiontube T may be attached to seat-tubes 2 little lower, thus lowering its middle portion for easier mounting and dismounting of the vehicle. Another way to secure seat-tubes 2 is to remove both seats from the bicycles and insert the short ends of T torsiontube into seat-tubes 2 and securing them with the original seat-post clamps, then installing individual seats or one wider "bench seat" as shown in FIG. 25-F to the torsiontube T as desired.

As shown in detail in FIG. 3-A, torsiontubes F,T and B may be attached to the bicycle frame tubes in 3 relative positions dictated by the type of support and stability that is desired: mounting them inboard of the bicycle tubes as indicated by T and the bolts 18 positioned transversely to the vehicle will make the vehicle more stable transversely than longitudinally; mounting them on either front or back of the frame tubes as indicated by TF or TB, with bolts 18 positioned longitudinally to the vehicle, will make the structure more stable longitudinally than transversely; and these types of securement could be used in combinations to meet the anticipated usage of the vehicle.

FIG. 3-B is a cross sectional view of typical torsiontube T secured to a typical bicycle tube such as 2; the bolt 18 passes through both tubes and is secured by a wing-nut 15; where desired, either all or some of the holes may be provided with bushings 22 comprising contour-shaped washers to prevent collapsing of the tubes caused by severe abuse, and to keep the moisture from collecting in the bicycle tubes when they are used individually, vinyl plugs or bolts are used to plug such openings.

FIG. 10 illustrates in more detail the rigid type of attachment as suggested by FIGS. 1,2 and 3: the short ends of all torsiontubes have two holes drilled in them at points F-1,F-2; B-1, B-2; and T-1, T-2; also, the correspondingly located bicycle tubes have correspondingly located holes drilled through them, as explained above, and when bolts 18 are inserted through thus aligned tubes and secured by means of wing-nuts 15, the vehicle will become stable but torsionally resilient the back torsiontube B will act as its rear axle, offering modified torsional suspension for rear wheels; the front torsiontube F offering the same benefits for the front wheels while the torsiontube T will provide torsional transverse rigidity at the seat level. If all pairs of these locating holes would be equally spaced, (let us say 12 cam apart), and provided for usage of standard diameter bolts 18 (let us say 6 mm), then this type of interconnecting structure and its components could be universally exchangeable with all bicycles modified for this type of coupling. Also, the same bicycles could be coupled to make a vehicle of any width from 80 cm as shown in FIG. 1 to any width desired, by simply using torsiontubes with longer mid-portions.

FIG. 10 also illustrates how torsiontube T may be locally reinforced by such means as plug inserts 20, made of wood or other suitable material which provide desired rigidity to the tube in the vicinity of the bolts 18 when they are excessively tightened. Also, to prevent localized collapse of the tubes when plug inserts 20 are not used, contour-shaped reinforcing washers 21 will provide sufficient rigidity around the bolts 18, as shown in more detail in FIG. 10-A, where the contour-washers 21 are used at both sides of the tube T while the tube 2 is shown with a replaceable bushing 22 which prevents enlargement of the hole and unwanted seepage of moisture into the tube 2 interior.

The steering system operatively interconnecting front wheels of the two coupled bicycles is designed on the trapezium principle of modified king-pin with track-arm and track-rod as used in the automotive industry, assisted by the modified ti-rod means, and as illustrated in FIGS. 1,2,3,5,6 and 6-A. As shown in FIGS. 2 and 3, each front wheel has its pivot point at the center line of handle bar stem 4 at point 9, and the length of its track-arm equals the distance between the front axle 7 and the pivot point 8 of the track-rod S on the trackarm bracket 10 in FIG. 6, although it is actuated by the operator from point 9 on top of the handle bar stem 4 in FIGS. 2 and 3.

As best seen in FIG. 6, the ends of track-rod S which is adjustable in its length are pivotally attached to track-arm brackets 10 which are secured to form crowns 13 and operatively rotatable in unison with the front wheel forks 12, and the track-rod bolts 8 are located inboard from the longitudinal center lines of front wheels, thus forming a trapezium defined by front axles 7, trackrod S and the track-arms 10 center lines which if extended would intersect substantially at the transverse center of the torsiontube B as indicated in FIG. 3 by lines 11; thus, the force applied by either of the handle-bars H need to act only on one of the wheels and the other front wheel will be automatically controlled by the trapezium linkage described. Since the vehicle is steerable by either of the handle-bars, the auxiliary non-rotating handle-bar A is provided for either one or both sides, thus allowing the person not wanting to steer to rest his hands on it, but in an emergency instantly resume the steering operation if so desired. As seen in FIGS. 1 and 5, the auxiliary handle-bars A, mounted back of the head tube 4, are configured not to interfere with the rotation of the regular handle-bars H or their adjustment.

FIG. 5 illustrates another modification of an adjustable hand rest A which permits not only vertical but also longitudinal adjustment of it as indicated by the dashed lines, by sliding it back or forward at the desired angle over the tubes of the bicycle and securing it by the wing nuts 15, while adjusting it vertically just like the seat.

FIG. 6 is a detail perspective view of one way of securing the track-arm bracket 10 to the front fork 12. Very simple stamping 10 is configured to fit over the fork-crown 13 and the existing front caliper bolt 14 is used for its attachment, while the forward sides of the bracket 10 are configured to extend inboard of and forwardly through the fork 12 and are bent around the fork blades and onto themselves for securing by self-locking bolts 43, thus forming very rigid but light and simple track-arm which may be left on bicycles even when they are used singly.

FIG. 6-A, taken in the direction of arrow 6-A in FIG. 3 shows the modified tie-rod assembly E used to prevent the front wheels of the vehicle from losing their proper camber under certain driving conditions. Normally the front wheel of a bicycle tends to stay perpendicular to the ground except when turning, but this feature is lost when two bicycles are coupled, especially when they are of the "light weight" and overloaded, tending to spread or converge at their points of ground contact. To overcome this tendency, the modified tie-rod assembly is configured as follows:

Over the inboard-facing bottom ends 76 of the front fork blades 12 are slipped sleeve housings 77 which are provided with holes 78 operatively positionable over the axle notches 79 in the ends 76 of the fork blades 12, thus allowing the front axles 7 to pass through housings 77 and be assembled and adjusted in normal fashion. Housings 77 have secured to their inboard facing sides threaded studs 80, over which are placed resilient cushioning spacers 81. The tie-rod itself comprises two sections: the longer rod section 85 and the shorter tubular section 86. The tubular section 86 is fashioned from rigid tubing which is collapsed on one end and provided with a hole 83 to fit over the stud 80; also it has elongated opening 82; the longer rod-like section 85 has one end flattened and provided with hole 83 to fit over the opposite stud 80, while its other end, which is slidably operable within the tubular section 86, has secured to it and protruding from it stud 84 which is slidably operable within the elongated opening 82 of the tubular section 86; thus the length of the slot 82 determines the amount of "lateral spread" the two front wheels are allowed, assisted by spring means 85-A; the length of slot 82 is controlled and laterally positioned by one or two of any type of SureType Clamp 88. The sleeve housings 77 could stay on the bicycles even when they are used singly, just like the trackarm brackets 10, but when being coupled, the ends of the tie-rod are slipped over studs 80, on top of resilient spacers 81, another set of spacers 81 are placed on top of the tie-rod ends, with locknuts 87 securing the assembly and serving as modified ball-and-socket joints for controlling the front wheel geometry of the vehicle.

FIG. 4 shows just one of many possible configurations of the basic torsionally resilient connecting members usable in this invention; it may be just a single tube of whatever diameter, wall thickness and quality needed to meet its anticipated requirements as explained in this disclosure, or composed of several assorted lengths of tubes or rods as shown in FIG. 4, tack-welded together at strategic points 16 to provide graduated torsional resistance; even angles, beams, bars and strips could be used; and where the weight is to be considered, laminated wood, bamboo and synthetic materials such as fiberglas could be utilized.

FIGS. 7, 8, 8-A and 9 illustrate some of many ways the torsiontubes may be attached to bicycle tubes without drilling any holes in them for light duty and only occasional use of the KONVERT-CYCLE vehicle. After the torsiontubes are properly located, the locating rings 16 are secured to the frame tubes; the plug inserts 20 may be inserted into the ends of torsiontubes to prevent them from collapsing; clamps K, made of metal or any suitable material are fitted around the two tubes and tightened by wing nuts 15. As shown in FIG. 8, this type of clamp is of the rigid, hinged configuration including compressible spacer-washer 19 and gripping means on the interior surfaces of the clamp to insure very secure grip to the tubes. FIG. 8-A shows a quick-type clamp buckle for instant attachment and removal from the bicycle tubes; it is secured permanently to torsiontubes by such as rivets 43, and the adjustable hinged buckle 48 providing secure attachment of its molded body 46 around the frame tubes as 2. FIG. 9 shows a typical two-piece clamp K with resilient space washers 19 and two bolts with wing nuts 15 for still more rigid installation.

Thus, FIG. 8-A illustrates the quickest and most temporary way of securing the torsiontubes to bicycle frames while the FIG. 10 shows the most stable and permanent connecting means. However, there are many intermediate ways between these two extremes, too numerous to mention, and therefore FIGS. 7 through 19 are submitted only as illustrative of the broad scope of this invention.

FIGS. 11 through 19 illustrate some of the possible ways to provide varied degrees of initial springing and resiliency to the aparatus before the torsional characteristics of torsiontubes come into effect, thus providing more sensitive degree of responsiveness to the torsionally interrelated movement caused by minor road irregularities and the distribution of the carried load. This is accomplished by using only one bolt to definitely locate and rotatably secure the torsiontubes at either of the two holes drilled in their shorter end portions and corresponding bicycle tubes while the other bolt is replaced by variously configured means of resilient resistance to resist the initial rotation of the shorter portion about said locating bolt means before the tortionality of the torsiontube itself is utilized. Since each of the two bicycles carries the weight of its rider on its own frame and its two wheels, the torsiontubes are not normally torsionally loaded and act only as transverse spacers and vertical stabilizing means for the two bicycles, except when the vehicle travels over uneven ground and each bicycle negotiates its own line of travel; therefore to increase the ability of the vehicle to negotiate greater surface irregularities and to produce softer, more resiliently cushioned ride, more sensitive pivotal play between these two points of attachment is desired.

Looking back at FIG. 2, the dashed lines pivoting about points F-1, T-1 and B-1 indicate in exagerted form the extent of possible rotation of the shorter portions of torsiontubes about these points whenever the vehicle would negotiate irregular road conditions, and it is obvious that if the bolts were at F-1, T-1 and B-1 as shown in detail in FIG. 11, the vehicle would be more stable transversely but less resilient longitudinally than if the bolts were at points F-2, T-2 and B-2 as shown in detail in FIG. 12, which would make the vehicle very resilient and able to negotiate greater road irregularities, but correspondingly less stable transversely.

FIGS. 11, 11-A, 11-B and 11-C illustrate one of the simplest means of providing resilient suspension for the vehicle, easily adjustable for various load and road conditions, by employing a resilient rubber strip 30. The vinyl spacer plate 24 has one hole for the bolt 18 at one end while its other end has locating stud 23 for snapping into the other hole at T-2. After the bolt 18 at T-1 pivotally secures the tubes 2 and T, the resilient rubber strip 30, as shown in detail in FIG. 11-A, and provided with eyelets 31 is installed as follows: one eyelet 31 is snapped over the stud 25 inserted into one of the holes at T-2, the strip 30, under desired tension, is wrapped around both tubes 2 and T several times and the other eyelet 31 of strip 30 is hooked under tension over another stud 25 inserted into the other hole at T-2 of the other tube, thus keeping them tightly together and resiliently resisting any pivotal movement of tube T about the bolt 18. Under emergency, the strip 30 may be cut from discarded inner tubes and the more stretched the strip is when being wrapped around the tubes the "stiffer" will the suspension be; also, only one longer stud 25 inserted into either of the tubes could be used for securing of both eyelets 31 thus requiring the drilling of only one locating hole in each of the bicycle tubes, located at either T-1,B-1,F-1 or T-2,B-2 and F-2, depending on what degree of "roadability" would be desired for the vehicle.

The long spacer 24 may be replaced by floating spacer 26 shown in FIG. 11-B, made of vinyl, nylon or other suitable material and positioned between the two tubes at T-2 and held there for operative engagement between them by the crisscrossed strip 30, while at T-1 the attachment may be as shown in FIG. 10-A, and if the bushings 22 are not used in the bicycle tube holes, the holes should be plugged with sealing pegs to keep out moisture from the tubes when the bicycles are used individually.

The resilient strip 30 may be used in combination with the fast connecting means as explained in FIGS. 7,8,8-A and 9 by simply using only one of the clamps K and the torsiontubes, which would have holes at T-1 and T-2 anyway, would be secured at one point by clamp K and at the other point by the strap 30 using the stud 25 inserted into the adjacent hole of the torsiontube for the strap securing by means of eyelets 31 over studs 25.

FIG. 11-C shows another modification in which a specially configured slide plate 28-A is formed integral with the stud 28; one of these is secured to each tube at T-2 holes for slidably operative contact with each other, with lubricant channel 29 to insure smooth action between them, and the strip 30 is wrapped around the tubes in such manner whereby it will not interfere with the function of slide plates 28-A but resist the pivoting of tube T about bolt 18 at T-1.

FIG. 12 shows the same type of embodiment as explained in FIG. 11, but in reverse order with bolts 18 installed at T-2 locations and strips 30 used at T-1 locations, thus providing for more flexible suspension of the vehicle, which would be very desirable when traveling over rough roads and irregular terrain. Thus the suspension system as disclosed could be converted by its owner at any time into several different capabilities such as for riding on smooth pavements by placing bolts 18 at T-1; for riding over rough roads by placing bolts 18 at T-2; and for hauling extra heavy loads over smooth streets by placing bolts 18 at T-1 and T-2 and many other combinations of presently disclosed configurations.

FIG. 13 illustrates another modification of the resilient connecting means wherein the ends of torsiontubes are formed to provide flaired portions 32 with smooth bearing surface 37 which will glide over the nylon spacer 24, and its end 33 is folded to form a stub portion configured to accomodate the rubber strip 30 secured to it by studs 25 as shown.

FIG. 14 shows another embodiment of FIG. 13, wherein each torsion tube has flared portion 32 which has attached to it replaceable housing 35 configured for smooth operative contact with similar housing 34 attached to frame tubes as 2 and configured for securement in similar fashion as 28 in FIG. 11-C, but instead of the lubricating channel it has a limited channel 29 which allows the ball bearing 36, which is located in the center of housing 35 only limited travel before the torsional resilience of the torsiontube is engaged. This embodiment provides for very sensitive and easy gliding action between the two tubes and easy replacement of the housings 34 and 35 when they are worn out; the resilient rubber strips 30 are installed the same way as in FIG. 13. Also, the long spacers 24 are replaced with spacer washers 24-A whereby the tubes are not in direct contact with each other through the whole space between T-1 and T-2 points of attachment.

FIG. 15 shows another modification which employs two slidably engageable plates 38 an 39 attached to tubes T and 2 respectively by such means as welds 40 or as suggested in FIG. 11-C, with small bearings 41 providing easy gliding engagement between the two plates as much as the resilient band 30 would allow.

FIG. 16 shows very simple configuration in which the end of torsiontube T is formed into flared section 32 and attached to its flat surface is replaceable nylon bearing strip 42 by such means as bolts 43, thus providing silent contact between the tubes. The protective, pliable boot D may be snapped over any of presently disclosed pivotally operable resilient connectors not only to retain any lubricants used but also to keep them free of dirt. Needless to say, there are many other possible configurations to provide the basic initial resiliency responsiveness to this coupling apparatus, but only the few simplest and most economical embodiments are presently described.

When it is desired to couple two bicycles more permanently into a QUADCYCLE, more substantial and permanent system of resilient suspension could be provided by many varied means, of which only this simplest and most economical is presented as a way of illustrating the broad scope of this invention:

FIGS. 17,18,19 and 19-A disclose modifications of the system using double-action tension and compression springs instead of the rubber strips 30, thus making the system more sturdy and permanent; also, only one hole is required to be drilled in the bicycle tubes, depending on which of the T-1 or T-2 points would be used for the pivotal attachment of the torsiontubes. Looking at FIG. 17, the end of torsiontube T is flared into as wide a shape 32 as practical and to it is attached a spring housing 42 by bolts 43; the special spring 45 is configured as seen in FIG. 19, with space in its middle to accommodate the tube 2 and its ends are secured to the end walls of housing 42 by spring clips 47. This embodiment would be very durable and permanent, and the tilting movement of the torsiontube T about point T-1 would be limited as indicated by the arrow 17.

FIG. 18 shows further modification of FIG. 17, wherein the spring housing 42 is longer to allow for greater spring resisted tilting of the torsiontube T, for use over very rough terrain.

FIG. 19 is a plan view of another embodiment showimg one half of the spring 45 longer than the other, thus permitting preloading of torsiontubes for specific applications. Also it shows how the tube T could be left in its tubular form for attaching the modified spring housing 42 by means of simple bolt 18 and especially configured spacer 49. Of course, even a pair of regular compression springs could be used in housing 42 if properly installed.

FIG. 19-A illustrates few of many possible ways of reinforcing the bent portions of the torsionally resilient connecting members such as torsiontubes F,T and B to prevent them from failing due to any excessive torsional overloading. If tubular or solid metal means are used, they may be specially treated in the area of their bending radius and hardened in those sections where bolted to the bicycle tubes, but for extra heavy duty service, solid or hollow reinforcing inserts 102 are inserted into the tubes before bending them, and if desired, these inserts may be extended to the end of the tube as indicated by 103, thus replacing the end-plugs 20 as was shown in FIGS. 7 and 10. Also, when the connecting members are configured of any type of a solid material such as wood, bamboo, or synthetics such as fiberglass, their bent portions may be diagonally reinforced by brackets 104, which have collars 105 rotatably slidable around the longer mid-portions but solidly secured to the shorter ends, thus not interfering with their torsional resilience. Means 102-A are installed at the bicycle factory to reinforce the bicycle tubes for heavy-duty service and if the torsional connectors are of solid material, such reinforcements as 102 and 103 would be of tubular configuration fitted over the ends before they are bent.

The above description illustrates only a few simplest configurations of my torsionally resilient interconnecting structure for connecting two existing bicycles to form one four-wheel vehicle, and it should be remembered that combinations of any of these means are possible, such as providing the resilient means only at tubes F and B, and securing the tube T at both T-1 and T-2 by bolts 18, thus creating a combination where all four wheels would have "softer" suspension than the seat area which has to manage the vertical stability of the two top-heavy riders.

FIGS. 20 through 25 are presented as illustrative of some of the basic concepts possible to provide for extra passenger and cargo carrying capability for the quickly connectable and disconnectable KONVERT-CYCLE as well as for the more permanently assembled QUAD-CYCLE, and their adaptability to make them more useful for work and more enjoyable for recreation. They are drawn to the same scale as FIGS. 2 and 3, with the bicycles about 32" (80 cm) apart, but only the relative locations of tubes T, F and B and the steering track-rod S are indicated to clarify approximate positions of suggested convertible configurations of various accessories to the basic vehicle structure.

Starting at FIG. 1, as shown in dashed lines, are two "soft-type" accessories. Over the torsiontubes F and T is suspended the UTILITY BAG W, constructed of pliable material, its front and back sides folded over the tubes F and T and secured to themselves by snaps 99, with handles 106 enabling its owner to carry the bag about and when not needed, roll it and secure it to either of the torsiontubes which will also accept saddlebags of various sizes.

The roll-away BACK STAND Y is also of pliable material which is doubled at its platform area, with a rigid member U to provide reinforced platform for standing or sitting, and when not needed, it is unsnapped from around the tube B, rolled around the member U and secured to the tube T by snaps 99.

FIGS. 20-20-A illustrate two accessories. The front GLOVE BOX 67 is suspended by its top frame 52 which rests over torsiontubes F and T and is secured to them by tethers 50 made of synthetic materials and configured as shown in FIG. 20-B, wherein the collar 54 forms a tether strap 55 for engagement with lock 56 formed by another collar 54 thus preventing the glove box from shifting sideways; the rigid side frame 51 is secured to rigid transverse stays 53 and the glove box exterior may be of any desired material, its interior conveniently compartmented and the lid 57 made securable from pilferage, while the ends of frame 52 would serve as handles to carry it about as desired.

The 8-way convertible CARRY-ALL Z is secured to torsiontubes T and B and when folded against them as shown in solid lines it provides shelf 59 to stand on or to tie parcels to, but when the combination lock-joints 62 which operatively connect the four assorted racks 57,58,59 and 61 are employed, seven different configurations of loading arrangements may be provided to accomodate varied cargoes, with the transverse bar 60 serving as a hand rail or a foot rest as needed. Whenever any rigid members as 52 of any auxiliary apparatus rest on top of any torsiontubes, the tubes have bearing sleeves 44 installed on them to prevent excessive wear and noise between them, as better explained in top of FIG. 14-A, wherein nylon bearing sleeves 44 are secured to members 52 where they are in gliding contact with torsiontubes. The dashed lines indicate various configurations of this apparatus and the dotted lines show how even bulky cargoes could be easily loaded and transported at an incline tangent to torsiontubes T and B.

FIGS. 21 and 21-A illustrate two versions of SHOPPERS'CONVERTIBLE apparatus consisting of a shopping basket and a shopping cart, so configured whereby a person could ride the Quadcycle to a shopping mall, park it in a special bicycle lot, detach his shopping cart from it and take it with him, and when finished shopping, simply wheel the cart back to the parked Quadcycle, couple them and pedal home. The cart could be constructed in the same manner as the common shopping cart except that a modified folding handle 64 with the locking type knuckle joint 62 to quickly secure the cart to the vehicle is added; the wheels 66 allow wheeling the cart around and the back gate may be dropped backwards for real bulky loads or forward to make a back-facing seat. The convertible shopping basket is constructed in similar fashion and designed to rest on torsiontubes F and T, while its' lid when opened serves as a carrying handle or a hand-rail for a child standing or sitting in the basket.

FIGS. 22, 22-A, 22-B illustrate the SPORTSMAN model, adapted for business and pleasure. It could be produced in one unit as shown or in two separately removable sections. The front section is a combination of glove box and trunk 67 with instrument controls in console 65, trunk space 68 with lockable cover 57 and inside steering lock 110; while its lower portion serving as a storage space and holding batteries 72 with wiring harness 71 to enable the Quadcycle operator to operate the battery powered accessories. Also, in more permanent conversions, such individual bicycle controls as gear-shifts, caliper or disc brakes, lights, turn indicators, parking lights, horns and any other accessories needed for efficient operation of the vehicle would be combined to be operable in unison from only the driver's side of the Quadcycle. FIG. 22-B shows in perspective the upper front portion of the console into which the turn indicators 69 and the headlight 70 are integrated and the unit is secured to tubes F and T in pilfer-proof manner by steel straps 50 and steering lock 110.

Thus, the Quadcycle may be operated for personal transportation of one or more people with only the front enclosed portion secured to it, but when necessary, any of the accessories supported by T and B torsiontubes could be easily added, since they are all interchangeable. The sturdy back section has reinforced wire rack bottom panels 73 and side guards 74 to carry varied cargoes or to serve as a seat or a stand for extra riders, and the unit could have removable protective covers of either rigid or pliable type.

FIGS. 23–23-A show one possible configuration of the DELIVERY cargo carrier in form of a large commercial push-cart movable about the shipping room until filled, and then connected to the Quadcycle by folding the wheels 75, pushing it forward and securing it to torsiontubes F and T while it rests on top of the tube B; the back and front end panels are collapsible to accomodate extra long items.

FIGS. 24–24-A show the COMMERCIAL cargo carrying unit configured as shown in solid lines or extendable even further down as indicated by the broken lines, and by making the front and back end panels collapsible or removable, very long objects such as lumber could be easily transported by it.

FIG. 25 shows just 14 of the endless possibilities in which this invention may be utilized;

FIG. 25-A shows a general utility carry-all body of metal or fiberglass construction with a long floor panel 90 and a tray or glove box 91; a roll-down cover 92 is secured by snaps 99 and when not needed it is rolled up and strapped to the tube T, FIG. 25-B shows a floor panel 90 supported by all three torsiontubes and configured to allow persons standing in front or back of the tube T, which may have padding 93, and the guest seat 95 swivels to allow easier access to it and may face forward or backward, including means for attaching a safety belt 96 to it;

FIG. 25-C shows smaller floor panel 90 with holes in it allowing it to be slidably, vertically adjustable over the height range as indicated by the arrow, over the tubes 98 which are secured to torsiontubes T and B; the auxiliary tube 97 is anchored to the T tube and the front of the floor panel 90 when it is in lower positions and to the back of the floor panel 90 and to the tube B when it is in its higher positions, including means to secure it at any height; thus the floor panel 90 could be used for standing or sitting and the hand guards 94 could be used for attaching a safety belt for seated person.

FIG. 25-D shows a semi-rigid folding bag W, configured to be supported by means of 2 rigid members resting on and slidably adjustable over tubes F and T to accomodate different bulk of articles carried and the bag may be easily carried about by means of the centrally located handle openings or compleately collapsed sideways and secured by snaps 99 to form a brief case or a shopping bag which may be carried to the store, filled and then hung over the torsiontubes and taken home. A loose, rigid panel fits into the bottom of the bag to provide a floor if desired. The one piece molded seat shell 95 is secured to torsiontube B by tether means 50 and is reinforced by support 89 of spring steel and adapted on its upper end to be secured to torsiontube T while its lower end terminates in a foot rest. The safety belt 96 may be extended to attach to seat stays for greater security of the seat occupant.

FIG. 25-E shows commonly used folding type shopping cart 100 as it could be carried supported by torsiontube B by means of attaching hooks 101 to the uprights 102 and simply strapped to torsiontube T for the slightly inclined positioning as shown, and the cart could be carried in this fashion either folded or loaded with groceries or standing children.

FIG. 25-F shows a stripped tubular chassis for carrying bulky parcels and long articles such as lumber. It could be of welded tubing and the clamps securing it to all torsiontubes are of any easily removable type. The bench seat 108 is adjustably secured to the torsiontube T which has its ends dropped into the bicycle seat tubes 2 and secured by the existing seat post clamps. If the bottom panels of the "rack" have wire screens or solid panels, an extra person could sit in the middle of the bench seat and others could stand on the back panel, holding on to the bar 93.

FIG. 25-G shows how the panel 90, described in FIG. 25-C could be used to support a seat which could face in either direction and the foot rest 89 is adjustably attachable to the front or back of the floor panel 90.

FIG. 25-H shows an enclosure with securable lids a,b,c and d allowing easy access to any part of the storage space which could be left unobstructed or compartmented into such sections as the glove box 91; the outside could be of rigid panels or pliable materials over a rigid frame structure of proper qualifications.

FIG. 25-J shows a rigid utility trunk W with a control console 65 in front and convertible interior which could accomodate seated or standing child; it is attached to torsiontubes F and T in theft-proof manner and the back lid 57 has lock-joint 62 for locking it into various angular positions to serve as either a back-rest or a seat for a youngster.

For the sake of uniformity and visual comparison all illustrated embodiments of this invention have been configured with two bicycles 32" (80 cm) apart, but of course it could be of any width desired and the wider its width, the greater the capacity of the vehicle not only for its lateral stability but for carrying extra people and cargo, so that even if increased only to 1 meter (39") four or five people could be easily transported, alternating in their pedaling and resting positions as desired. This is very serious matter when considering the apended claims, which for the sake of brevity are drawn just to the 80 cm width, but may be enlarged upon by any person skilled in the art, thus opening entirely different potentials for use of other utilitarian accessories useable with the basic KONVERT-CYCLE or the more permanent QUADCYCLE.

In conclusion, it is to be understood that the embodiments disclosed herein exemplify only some of many possible configurations of the broad concept of this invention and that it may assume many different forms of configurations, constructional concepts and applications radically different from those presently disclosed and illustrated, and therefore the structural and functional details illustrated and described are to be merely an illustrative basis for the following claims defining the scope of this invention.

It is also obvious that the presently disclosed type of interconnecting structure could be further modified in its scope to create other types of vehicles by coupling other components of transportation devices and that it could utilize other available means of construction and thus produce other end-results than presently disclosed.

The embodiments of the invention in which an exclusive property or privilege is claimed are defined as follows:

1. A torsionally resilient interconnecting structure for coupling two compatibly configured bicycles into side-by-side parallel relationship for simultaneous operation as a single four-wheel vehicle comprising: (1) a plurality of specifically configured cross members each bent to form a longer mid-portion and two shorter end-portions; said longer mid-portions positioned substantially horizontally and transversely between the coupled bicycles with said shorter end-portions being aligned with correspondingly positioned frame tubes of said bicycles and being attached to said frame tubes at two spaced apart points along each aligned section; and (2) a modified trapezium steering linkage operatively interconnecting conventional steerable front wheels of said bicycles enabling the vehicle to be efficiently steered from either one of said bicycles.

2. The structure of claim 1 wherein the longer mid-portion of each cross member is configured of a plurality of torsionally resilient members of assorted lengths secured together in such a manner as to provide a predetermined degree of stability and torsional resilience to the vehicle.

3. The structure of claim 1 wherein said cross members are made of bent laminated wood.

4. The structure of claim 1 wherein said cross members are made of a synthetic composition such as fiberglass.

5. The structure of claim 1 wherein said cross members are made of a fibrous natural material such as bamboo.

6. The structure of claim 1 wherein the means of attachment at said spaced apart points comprises quick acting clamping means at one of said points and easily attached resilient straps at the other of said points for providing limited pivotal movement while retaining ease of assembly and disassembly of said vehicle.

7. The structure of claim 1 further including vertically and longitudinally adjustable hand rest means for a rider who does not steer the vehicle.

8. The structure of claim 1, wherein the bent portions of said connecting members an angularily reinforced by modified bracing means diagonally spanning said bent portions, with one end of the bracing means secured to said shorter end-portions and the other end slidably attached to said longer mid-portion of said cross members, to resist angular collapse under severe transverse stresses against said vehicle without interfering with the torsional resilience.

9. The structure of claim 1, wherein the bent portions of said connecting members are reinforced by tubular means to increase their resistance to excessive torsional and angular loads.

10. The structure of claim 1, including accessory means for transporting passengers and cargo in addition to the two riders of said two bicycles.

11. The structure of claim 1 wherein the means of attachment at said spaced apart points comprises quick acting clamping means for easy and repeated assembly and disassembly of said vehicle.

12. The structure of claim 11 wherein said quick acting clamping means are permanently attached to the shorter end-portions of said cross members.

13. The structure of claim 1 wherein the shorter end-portions of one cross member are adapted to be adjustably insertable into the top of the existing seat tubes of said bicycles after removing the two conventional bicycle seats and are secured by existing seat post clamps.

14. The structure of claim 13 including a special modified bench type seat which is attached to said one cross member.

15. In combination with claim 1, an auxiliary carrying means to transport additional cargo and passengers, the means attached to, supported by and securably located on said longer mid-portions of said cross members of said vehicle in a manner whereby the torsional resiliency of said connecting members is not inhibited and the operational functions and efficiency of said vehicle are not impaired by such attachments.

16. The combination of claim 15, wherein said auxiliary carrying means are easily attachable and detachable from said connecting members and readily convertible to accommodate varied types of cargo, sitting and standing people in various combinations.

17. The combination of claim 15, wherein said auxiliary carrying means are partly enclosed and configured to be suspended from some while resting on top of other cross members, including tethering and positioning means to prevent their unwanted transverse sliding movement over said cross members.

18. The combination of claim 15, wherein said auxiliary carrying means comprise specifically configured enclosures incorporating such accessories as headlights, turn indicators, stop lights, horns, and other equipment needed for efficient operation of said vehicle including interconnecting controls, instrument consoles and power sources for such auxiliary accessories.

19. The combination of claim 15, wherein said auxiliary carrying means is configured as a shopping cart, easily securable to two rearward cross members, easily removable for pushing on its own two wheels, and again easily secured to said vehicle for transporting.

20. The combination of claim 15, comprising convertible and easily removable shopping basket enclosure to be supported by two upper cross members of said vehicle.

21. The combination of claim 15, comprising a large cargo carrier supported by all cross members and extended through the over-all length of said vehicle, its front and back ends configured to be opened to allow transport of goods longer than said vehicle.

22. The combination of claim 15, comprising two rigid members longitudinally spanning two upper corss members and adjustably secured to them, and supporting a pliable convertible travel bag which is transversely expandable and adapted to accommodate various sizes of cargo and children.

23. The combination of claim 15, comprising a back facing seat shell secured to a bottom cross member at two points while the top of its back-cushion portion is secured to an upper seat tube cross member by an elongated resilient member which acts as a spring for the seat.

24. The combination of claim 15, comprising a rigid, weather proof and lockable security enclosure suspended between two upper cross members in a theft-proof manner, including an instrument control enclosure and a storage space convertible to carry an infant, seated or standing child or a youngster seated on an opened cover of the enclosure.

25. The combination of claim 15, wherein said auxiliary carrying means comprises a tubular frame structure suspended from three cross members and adapted to accept open wire mesh panels when an open type of carrier is desired and to accept floor and side panels if an enclosed type carrier is needed.

26. The combination of claim 15, comprising double compartment "saddle-bag" type enclosures specifically configured to straddle and be secured to the upper cross members of said vehicle.

27. The combination of claim 15, wherein said auxiliary carrying means are extended transversely to span over an unoccupied bicycle, thus increasing the capacity and versatility of said carrying means.

28. The combination of claim 15 wherein said auxiliary carrying means are configured as open wire structures with easily installable and removable protective covers.

29. The combination of claim 15, comprising a large, specifically shaped delivery cart adapted for pushing around on its own wheels and easily attachable to said connecting members of said vehicle for more distant transportation.

30. The combination of claim 15, wherein said auxiliary carrying means are configured of tubular frames with intermediate panels of wire and rod screens.

31. The combination of claim 15, comprising a rigid panel enclosure positioned between the rear wheels of said vehicle and continued as a narrower enclosure positioned between the two riders and terminating in an integral storage and glove box.

32. The combination of claim 15, comprising two rigid auxiliary members secured at an incline between two rearward cross members, a rigid panel adapted to be operably slidable and securable to said auxiliary members at various heights to provide a seat or stand for a passenger.

33. The combination of claim 15, comprising adaptive means of securement for safety belts, passenger restraining devices and accessory straps to secure the assorted cargo and people to said auxiliary carrying means and to said vehicle structure.

34. The combination of claim 15, comprising padded covers for those sections of said vehicle and auxiliary carrying means with which its users might come into harmful contact under any collision conditions of said vehicle.

35. The combination of claim 15, comprising a floor panel adapted to securely accept seats for passengers facing in either direction.

36. The combination of claim 15, comprising tethering means to secure baby carriages, strollers, shopping carts and other compatible conveyances to said vehicle structure.

37. The combination of claim 15, comprising a rigid floor panel secured to the top of the back bottom cross member and suspended from two upper cross members to provide a platform for transporting standing passengers and bulky goods.

38. The combination of claim 37, including means to secure to said platform a seat facing in either direction with interchangeably positionable foot rest means for a seated passenger.

39. The structure of claim 1, wherein said steering linkage is configured as a trapezium linkage adapted for specific use with coupled bicycles, employing a modified king-pin with track-arm and track-rod steering control geometry, wherein track-arm means which are operatively attached to the front wheel forks of said bicycles are inclined to the longitudinal axis of the bicycles.

40. The structure of claim 39, wherein said track-arm means are securely attached to the front wheel fork-crowns of said bicycles and extend substantially rearwardly and inwardly, including means on their rearwardly and inwardly facing portions for operative attachment of a two-section, length adjustable track-rod which constitutes the shorter transverse side of said trapezium linkage system for the steering of said vehicle.

41. The structure of claim 40, further including a modified tie-rod positioned transversely between and operatively connected to modified radius-arms which are secured to the inboard-facing ends of the front axles of said bicycles to provide for a properly coordinated relationship between said front wheels of said vehicle and which constitutes the longer side of said trapezium linkage system.

42. The structure of claim 41, wherein the tie-rod is configured in two sections: one being of tubular configuration acting as the yoke-end, the other configured to have one end operatively slidable within said yoke-end and comprising adjustable means to control the amount of slidable movement allowed between the two sections in relation to each other in order to permit proper operative relationship between said front wheels at all times, the outboard ends of said tie-rod being provided with holes to secure them to said modified radius-arms.

43. The structure of claim 42, wherein said tie-rod includes spring means to restrain the slidable movement between its two sections, thus to control the camber and wobble of the front wheels of said vehicle.

44. The structure of claim 41, wherein said radius-arms comprise a housing configured to be easily securable to the inboard facing fork-ends of the conventional front wheel fork blades and provided with a hole for clearance of the inboard end of the conventional front axle, each housing having secured to it an elongated stud over which the outward ends of the tie-rod are fitted and secured.

45. The structure of claim 44, wherein said elongated stud allows for installation of resilient cushion blocks on both sides of the tie-rod ends, and including means for lubrication and a dustproof cover for the assembly which functions as a modified ball-and-socket tie-rod bearing.

46. The structure of claim 1 wherein the bent portions of said cross-members are reinforced by tubular means attached before bending in unison.

47. The combination of claim 1, wherein such individual controls of said coupled bicycles as are essential for efficient, safe and legal operation of the coupled bicycles are combined to be operable and controllable in unison by a single its driver.

48. The combination of claim 1, wherein said interconnecting structure is so standardized that any two compatibly configured and adapted bicycles may be coupled interchangeably for ease of repairs and replacement.

49. The combination of claim 1, wherein said interconnecting structure is configured that each bicycle may be used on both left and right side of said vehicle alternately and interchangeably.

50. The structure of claim 1 wherein each cross member is tubular in form and constructed of such material as will provide adequate strength for maintaining a stable side-by-side parallel relationship between said bicycles while retaining torsional resiliency of thus configured vehicle.

51. The structure of claim 50 wherein the means of attachment at said spaced apart points comprises connecting bolts of sufficient length to pass through holes across the centers of both aligned tubular members.

52. The structure of claim 51 wherein said bolts are positioned parallel to the longitudinal center line of the vehicle to provide transverse resiliency to the structure.

53. The structure of claim 51 wherein said bolts are positioned transversely to the longitudinal center line of the vehicles to provide transverse rigidity to the structure.

54. The structure of claim 51 wherein said connecting bolts pass through bushing means in the tubular members to prevent enlargement of said holes under stress.

55. The structure of claim 51 including closure plugs for sealing the holes in the bicycle frame tubes when said bicycles are disconnected for individual use.

56. The structure of claim 51 including reinforcing means inserted between the aligned tubular members to prevent said tubes from collapsing when said bolts are tightened.

57. The structure of claim 51 wherein said cross members are positioned between three correspondingly positioned frame tubes radiating from conventional crank housings of said bicycles and operatively attached as far away from said crank housings as possible.

58. The structure of claim 51 wherein each shorter end-portion is reinforced by rigid plug means inserted into the tube end to extend past both connecting bolts.

59. The structure of claim 50 wherein the means of attachment at said spaced apart points comprises bolt means for secure but pivotally operative attachment at one of said points and resiliently yieldable means at the other of said points configured to resist the pivotal movement about said bolt means.

60. The structure of claim 59 wherein said resiliently yieldable means is adjustable to suit the load and terrain conditions encountered by said vehicle and including stop means to limit the amount of pivotal movement about said bolt means.

61. The structure of claim 59 comprising means to locally protect said bicycle frame tubes from frictional wear caused by the pivotal movement of said shorter end-portions of said cross-members against said frame tubes.

62. The structure of claim 59 further comprising slidable guide means positioned away from said bolt means restraining said shorter end-portion from pivoting about any axis other than the axis of the bolt means.

63. The structure of claim 62 wherein the slidable guide means is formed by flaring the end of the shorter end-portion to form a flat configuration which slides against said bicycle frame tube and comprises means to limit such slidable movement.

64. The structure of claim 62 wherein said slidable guide means includes lubricant retaining means for reducing friction and protective cover means for excluding dirt.

65. The structure of claim 62 wherein said bicycle frame tubes comprise friction reducing means positioned for operative contact with said slidable guide means of said shorter end-portions.

66. The structure of claim 59 wherein said resiliently yieldable means comprises double acting tension and compression springs staddling said bicycle frame tubes.

67. The structure of claim 66 wherein said springs are of unequal lengths on opposite sides of said frame tubes thus providing different torsional resilience in opposite directions.

68. The structure of claim 66 wherein the ends of said shorter end-portions are flared for securement to them of housing means of said double-acting spring means.

69. The structure of claim 59 wherein said resiliently yieldable means comprises a band of resilient rubber of predetermined width and length wrapped under desired tension several times around both aligned tubes, including means to secure the ends of said bands to said tubes.

70. The structure of claim 69 further including friction resistant spacer means positioned between the aligned tubes to prevent direct contact between said tubes.

71. The structure of claim 70 wherein said spacer means are floating and freely slidable between the aligned tubes and retained in the operative position by said band of resilient rubber.

* * * * *